United States Patent
Woods et al.

(10) Patent No.: US 11,494,990 B2
(45) Date of Patent: Nov. 8, 2022

(54) HYBRID PLACEMENT OF OBJECTS IN AN AUGMENTED REALITY ENVIRONMENT

(71) Applicant: Google LLC, Mountain View, CA (US)

(72) Inventors: Bryan Woods, Santa Clara, CA (US); Jianing Wei, Cupertino, CA (US); Sundeep Vaddadi, Mountain View, CA (US); Cheng Yang, Mountain View, CA (US); Konstantine Tsotsos, San Francisco, CA (US); Keith Schaefer, San Pedro, CA (US); Leon Wong, San Francisco, CA (US); Keir Banks Mierle, Mountain View, CA (US); Matthias Grundmann, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/620,264

(22) PCT Filed: Oct. 7, 2019

(86) PCT No.: PCT/US2019/055021
§ 371 (c)(1),
(2) Date: Dec. 6, 2019

(87) PCT Pub. No.: WO2020/076715
PCT Pub. Date: Apr. 16, 2020

(65) Prior Publication Data
US 2020/0211288 A1 Jul. 2, 2020

Related U.S. Application Data

(60) Provisional application No. 62/742,772, filed on Oct. 8, 2018.

(51) Int. Cl.
*G06T 19/00* (2011.01)
*G06F 3/04815* (2022.01)
*G06T 19/20* (2011.01)

(52) U.S. Cl.
CPC ........ *G06T 19/006* (2013.01); *G06F 3/04815* (2013.01); *G06T 19/20* (2013.01)

(58) Field of Classification Search
CPC ........ G06T 19/00; G06T 19/20; G06F 3/0481
See application file for complete search history.

(56) References Cited

U.S. PATENT DOCUMENTS

2012/0249741 A1* 10/2012 Maciocci .............. G06T 15/503
348/46
2014/0282220 A1 9/2014 Wantland et al.
(Continued)

FOREIGN PATENT DOCUMENTS

WO 2018102615 A1 6/2018

OTHER PUBLICATIONS

International Search Report and Written Opinion for PCT Application No. PCT/US2019/055021, dated Jan. 30, 2020, 13 pages.

*Primary Examiner* — Matthew Salvucci
(74) *Attorney, Agent, or Firm* — Brake Hughes Bellermann LLP

(57) ABSTRACT

In a general aspect, a method can include receiving data defining an augmented reality (AR) environment including a representation of a physical environment, and changing tracking of an AR object within the AR environment between region-tracking mode and plane-tracking mode.

21 Claims, 13 Drawing Sheets

(56) References Cited

U.S. PATENT DOCUMENTS

2015/0062120 A1* 3/2015 Reisner-Kollmann ...................... G06T 19/006
  345/419
2019/0340821 A1* 11/2019 Chen ....................... G06F 3/017

* cited by examiner

HYBRID PLACEMENT OF OBJECTS IN AN AUGMENTED REALITY ENVIRONMENT

RELATED APPLICATIONS

This application is a 35 U.S.C. § 371 National Phase Entry Application from PCT/US2019/055021, filed on Oct. 7, 2019, and designating the U.S., which claims priority to, and the benefit of, U.S. Provisional Application No. 62/742,772, filed on Oct. 8, 2018, the disclosures of which are incorporated by reference herein in their entireties.

TECHNICAL FIELD

This document relates, generally, to rendering of computer-generated objects in an augmented reality (AR) environment. More specifically, this document relates to approaches for placement, manipulation (e.g., elevating, moving, etc.) of objects (e.g., AR objects) in an AR environment.

BACKGROUND

In the context of computer-based consumption of media and other content, it is becoming increasingly common to provide a user (viewer, participant, etc.) with immersive experiences. One field involves the presentation of virtual reality (VR) and/or augmented reality (AR) environments on a device, such as a smartphone or a tablet. In an AR environment, a person can watch a screen that presents at least both an aspect of a physical environment (e.g., a video or real-time image of a physical space) and an aspect of VR (e.g., a virtual object superimposed on the video or image) to provide an AR experience.

SUMMARY

This document describes systems and methods for displaying augment reality in which a user can place and manipulate virtual (e.g., computer-generated) objects in a view of a physical space. In a general aspect, a method can include receiving data defining an augmented reality (AR) environment including a representation of a physical environment, and changing (e.g., modifying) tracking of an AR object within the AR environment between a region-tracking mode and a plane-tracking mode.

The details of one or more implementations are set forth in the accompanying drawings and the description below. Other features will be apparent from the description and drawings, and from the claims.

DETAILED DESCRIPTION

Figure 1A:
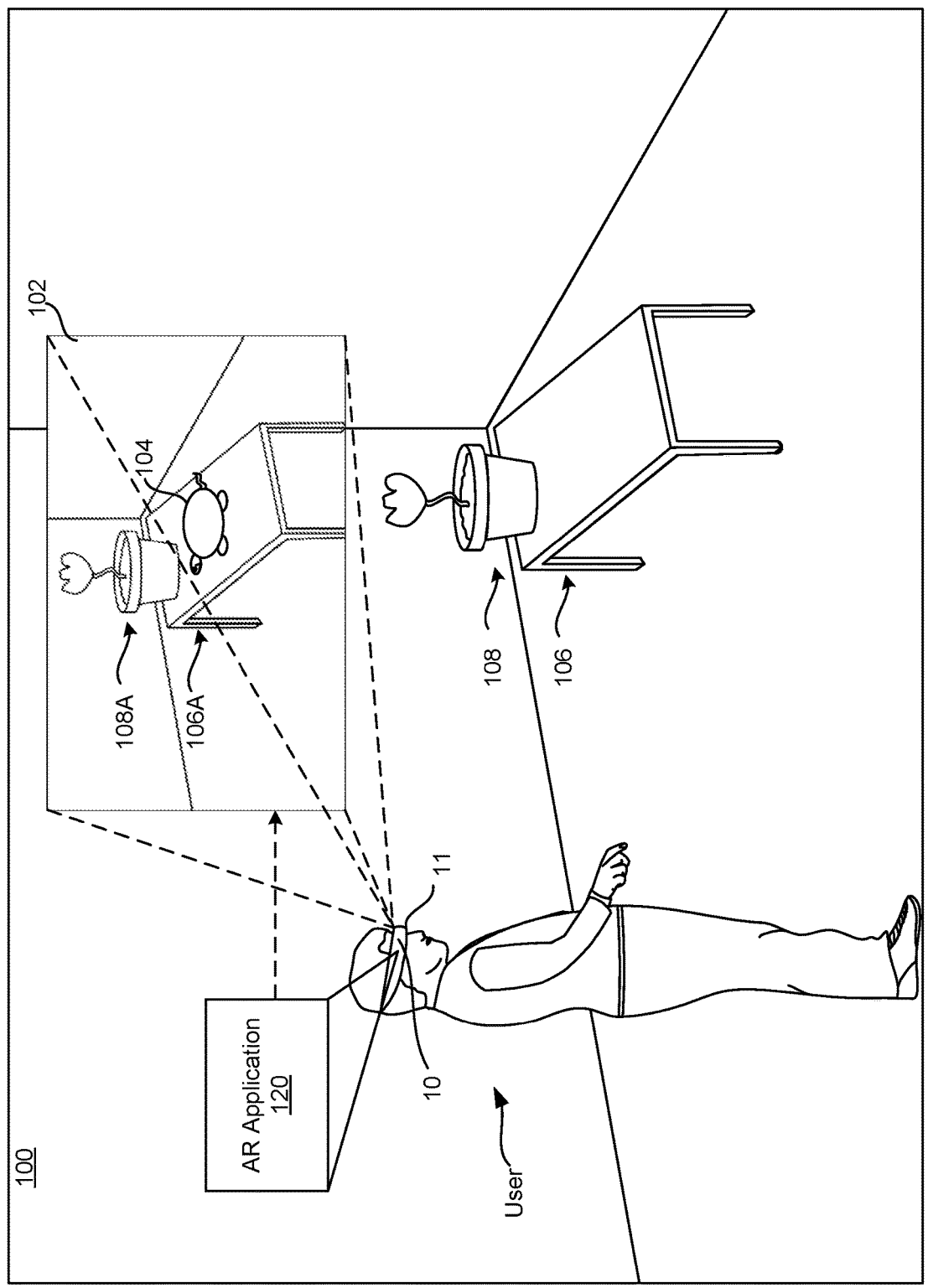
FIG. 1A is a third person view of an example physical space, in which a user is experiencing an augmented reality (AR) environment through a display.

The systems and methods described herein are related to placement of an augmented reality (AR) object within an AR environment based on a plane (e.g., a flat plane) associated with a real-world object and/or an augmented region that is a two-dimensional region (e.g., a box region) associated with a real-world object. Placement of the AR object within the AR environment based on a plane can be performed using a plane-tracking mode and placement of the AR object within the AR environment based on an augmented region can be performed using a region-tracking mode. Placement of the AR object within the AR environment can be based on the plane (using the plane-tracking mode) when an augmented region is not detected (e.g., due to missing image data, due to inability to identify an object) or can be based on the augmented region (using the region-tracking mode) when the plane is not detected (e.g., due to insufficient computing resources and/or too flat of a viewing angle, due to a flat object not being detected). Use of a combination of the plane-tracking mode and the region-tracking mode for placement of an AR object can be referred to as hybrid placement.

The hybrid placement concepts described herein can be used in scenarios where a plane (e.g., a plane associated with a real-world object surface) has not been detected or where a plane (e.g., a horizontal plane, vertical plane) does not exist within the AR environment. The hybrid placement concepts described herein can be used to place an AR object within an AR environment when an augmented region is detected and without information about the depth of the AR object within the AR environment. The concepts described herein can eliminate delay (e.g., latency) in placing an AR object, can allow for placement of AR objects with limited depth information, can allow for placement of a variety of AR objects, and/or so forth. AR objects can be placed anywhere within a camera view of the device, and the AR object can be expected to stick (e.g., be maintained, be held) where it is placed (visually), without information about depth (e.g., three-dimensional depth). The hybrid placement concepts described herein can be used to select tracking modes to accomplish these advantages.

Although many of the examples described herein are described in terms of placement of the AR object, placement of the AR object can include initial placement, tracking, movement, and/or so forth of the AR object. In some implementations, initial placement can be performed using dragging, tap-to-place, and/or so forth. The plane-tracking mode, the region-tracking mode, and/or other tracking modes can collectively be referred to as tracking modes.

In some implementations, the AR environment can be a mixed reality environment including a mixture of virtual objects and physical objects (e.g., virtual objects within a physical or real-world (e.g., streamed into a device display)). The AR environment can be displayed within a display of a device such as a head-mounted display (HMD), a mobile device, a laptop computer, AR glasses, and/or so forth. The AR environment can be an environment where the user can place and interact (e.g., manipulate, elevate, move, interact with, etc.) with virtual objects in a physical space within the displayed AR environment (e.g., mix of physical objects and/or physical environment with virtual objects overlaid on the physical objects and/or environment). In some implementations, such virtual objects can include stickers, characters, sprites, animations, three-dimensional (3D) renderings, and so forth.

In some implementations, the planes within the AR environment, when using the plane-tracking mode, can represent (e.g., approximate) the surface of a real-world object. The plane can be a three-dimensional plane (having a depth (e.g., having portions associated with a X, Y, and Z directions and a depth parameter)) associated with a surface of a real-world object within the AR environment. For example, the depth of the plane may be described by one or more parameters. In some implementations, an augmented region can be a two-dimensional region without a three-dimensional depth. In some implementations, the augmented region can represent (e.g., approximate) a space (e.g., a two-dimensional space, an outline) occupied by a real-world object within the AR environment. The real-world objects can be physical objects displayed within the AR environment.

FIG. 1A is a third person view of an example physical space 100, in which a user is experiencing an AR environment 102 through a display 10 of an HMD 11. The AR environment 102 can be generated by an AR application 120 and displayed to the user through the HMD 11, or other device. The AR environment 102 includes inserted AR object 104 (e.g., content) that is displayed over an image of the physical space 100 (which can be displayed within the display using a pass-through (e.g., outward facing) camera attached to the HMD 11). In this example, the AR object 104 is a turtle on a representation 106A of a table 106 near a representation 108A of a flower 108 in the AR environment 102.

Although this implementation is illustrated with an HMD 11, other types of devices can be used in conjunction with or instead of the HMD 11 such as a mobile phone, laptop computer, and/or so forth. In such implementations, the user could hold the device and can view the AR environment through a display associated with (e.g., included in) the device.

The AR object 104 can be placed in the AR environment 102 based on a plane using a plane-tracking mode and/or an augmented region using a region-tracking mode. The plane-tracking mode is illustrated in FIG. 1B and the region-tracking mode is illustrated in FIG. 1C.

Figure 1B:
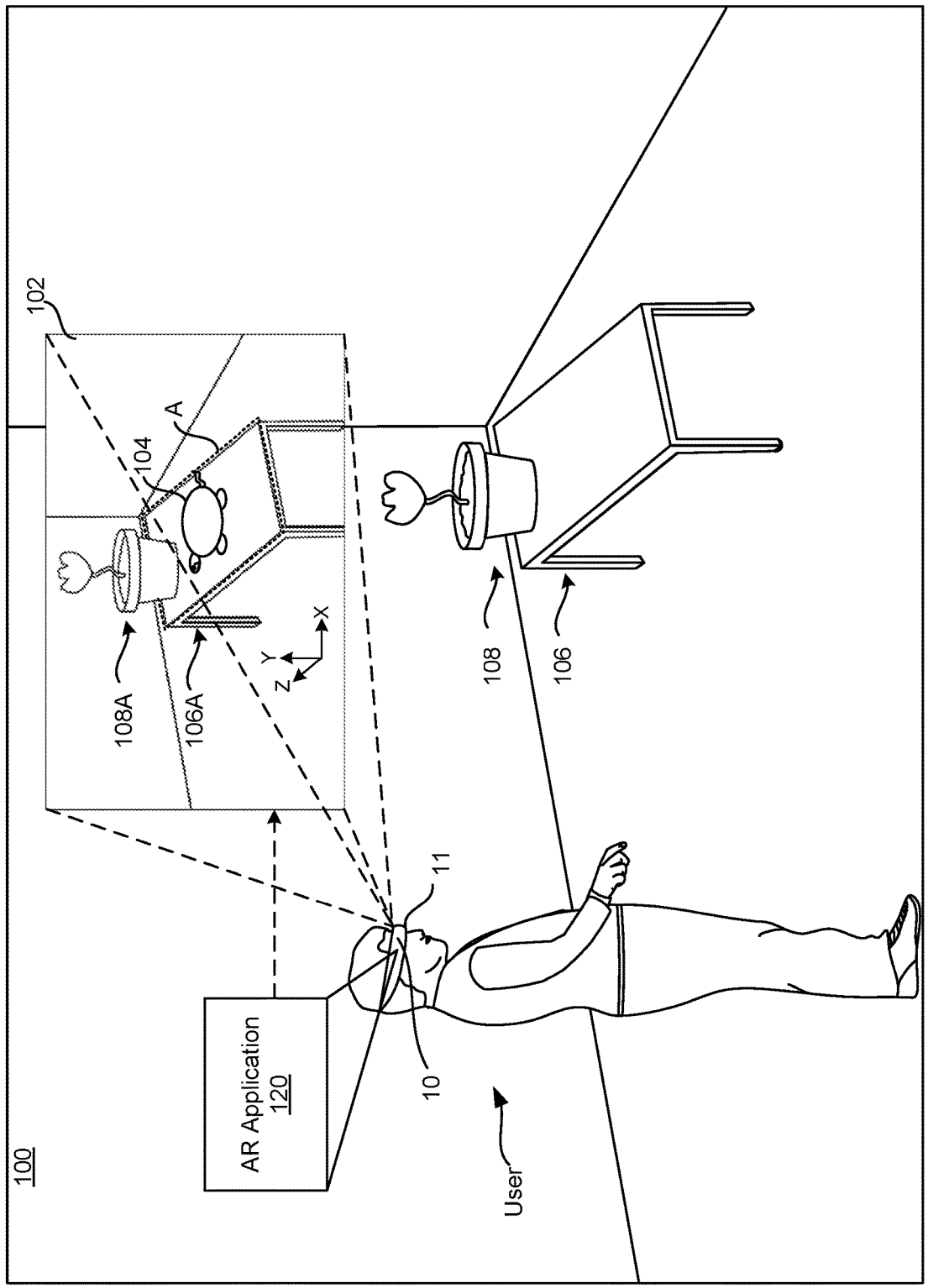
FIG. 1B illustrates the AR object being placed within the AR environment shown in FIG. 1A based on a plane in a plane-tracking mode.
Figure 1C:
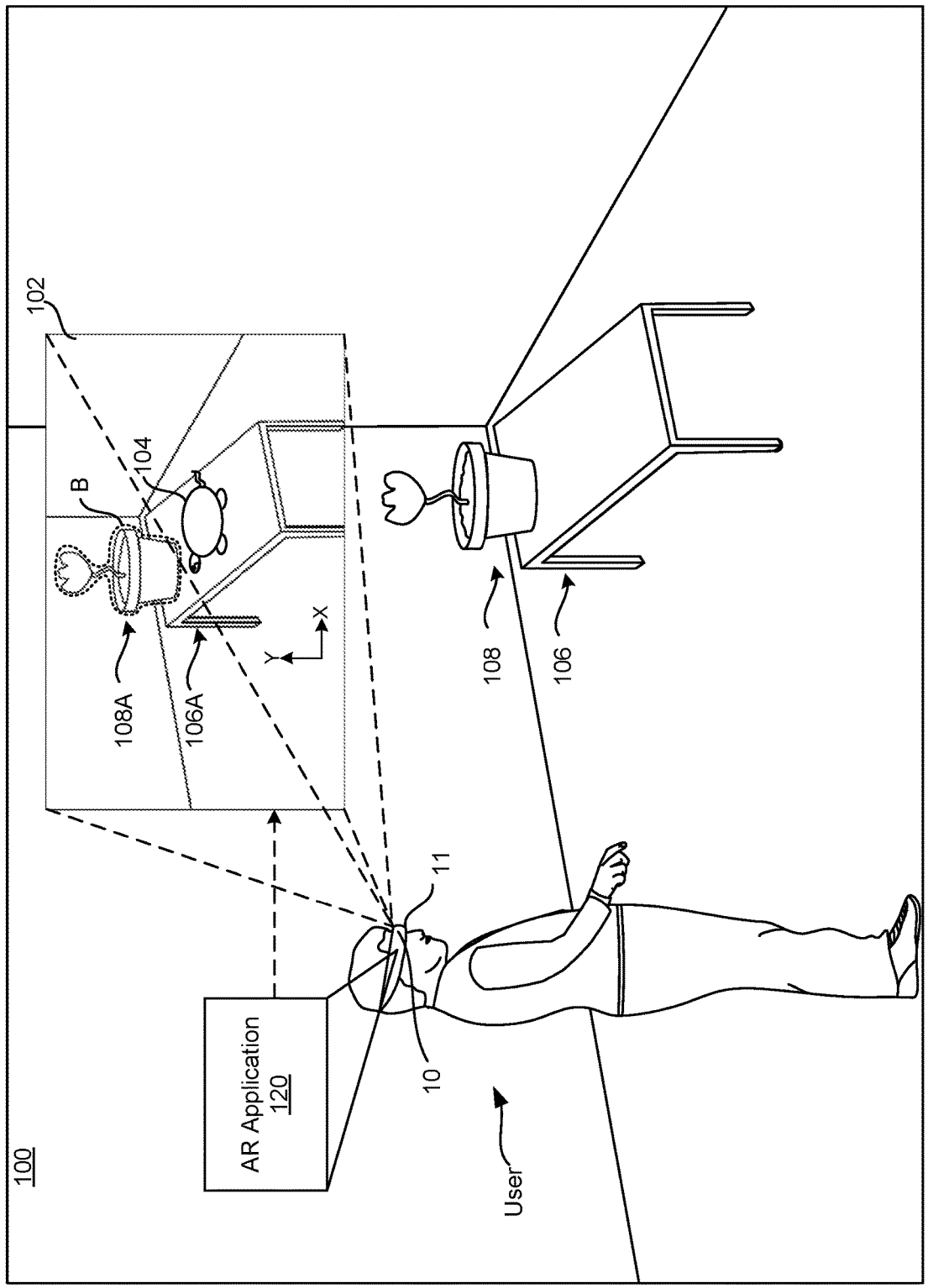
FIG. 1C illustrates the AR object being placed within the AR environment shown in FIG. 1A based on an augmented region in a region-tracking mode.

FIG. 1B illustrates the AR object 104 being placed within the AR environment 102 based on a plane A associated with the table 106A. The plane A is shown with a dashed line in FIG. 1B, but generally is not visible within the display 10 to the user. Specifically, the plane A represents a three-dimensional surface of a top of the table 106A and the AR object 104 is disposed on the plane A. A depth of the AR object 104 can be determined and the AR object 104 can be placed on the plane A using the depth of the AR object 104. The plane A also has a three-dimensional depth within the AR environment. In some implementations, the plane A can be represented by a collection of points each with an XYZ location (and depth).

When the user moves within the physical space 100, the AR environment 102, and the virtual objects therein, are moved in a corresponding fashion based on the plane-tracking mode. In other words, the AR object 104 and the plane A are moved within the AR environment 102 based on the movement of the user in the physical space 100. The AR object 104 and the plane A can be moved and placed within the AR environment 102 based on the depth information associated with the AR object 104 and the plane A.

For example, if the user moves away from the table 106 in the physical space 100, the AR object 104 can have an appearance with the AR environment 102 shown in the display 10 (e.g., within the screen of the user) that is further away. This rendering can be based on the depth information associated with the AR object 104 and the plane A.

FIG. 1C illustrates the AR object 104 being placed within the AR environment 102 based on an augmented region B associated with the flower 108A. The augmented region B is shown with a dashed line in FIG. 1B, but generally is not visible within the display 10 to the user. Specifically, the augmented region B represents a two-dimensional surface associated with the flower 108A (without a depth) and the AR object 104 is disposed near the augmented region B. A depth of the AR object 104 can be approximated and the AR object 104 can be placed within the AR environment 102 using the approximated depth of the AR object 104 and the location of the augmented region B. In some implementations, the augmented region B can be represented by a collection of points each with an XY location (and no depth information).

When the user moves within the physical space 100, the AR environment 102, and the virtual objects therein, are moved in a corresponding fashion based on the region-tracking mode. The AR object 104 and the augmented region B can be moved and placed within the AR environment 102 based on the approximated depth information associated with the AR object 104 based on the size of the augmented region B. In other words, depth (e.g., approximated depth) of the AR object 104 within the AR environment 102 can be based on the size of the augmented region B.

For example, if the user moves away from the flower 108 in the physical space 100, the AR object 104 can have an appearance with the AR environment 102 shown in the display 10 (e.g., within the screen of the user) that is further away. This rendering can be based on the size of the flower 108A (and the associated augmented region B) decreasing in size and an approximated increasing depth associated with the AR object 104 based on the decreasing size of the flower 108A (and the associated augmented region B).

In some implementations, placement of the AR object 104 can be based on the plane-tracking mode (for a first period of time) and then switched to the region-tracking mode (for a second period of time). For example, initial placement of the AR object 104 can be based on the plane A in the plane-tracking mode. After being initially being placed (and tracked) based on the plane-tracking mode, tracking can be switched to the region-tracking mode and movement of the AR object 104 can be based on the augmented region B using the region-tracking mode.

In some implementations, placement of the AR object 104 can be based on the region-tracking mode (for a first period of time) and then switched to the plane-tracking mode (for a second period of time). For example, initial placement of the AR object 104 can be based on the augmented region B in region-tracking mode. After being initially being placed (and tracked) based on the region-tracking mode, tracking can be switched to the plane-tracking mode and movement of the AR object 104 can be based on the plane A using the plane-tracking mode.

In some implementations, placement of the AR object 104 can be based on a combination of the plane-tracking mode (FIG. 1B) and the region-tracking mode (FIG. 1C). For example, placement of the AR object 104 can be based on a combination of the plane A and the augmented region B.

In some implementations, tracking can include identifying a plane associated with a real-world object or an augmented region associated with the real-world object and can use the coordinates (e.g., XYZ coordinates and/or depth information) of that plane or augmented region as an anchor or reference for placement of an AR object. For example, region-tracking mode can include identifying the augmented region B associated with the real-world object 106A and can use the XY coordinates of the augmented region B as an anchor or reference for placement of the AR object 104. As another example, plane-tracking mode can include identifying the plane B associated with the real-world object 108A and can use the XYZ coordinates and depth of the plane B as an anchor or reference for placement of the AR object 104.

In some implementations, placement can be based on a comparison of placement of the AR object 104 using the plane-tracking mode (FIG. 1B) and the region-tracking mode (FIG. 1C). For example, placement of the AR object 104 can be calculated using the plane-tracking mode and calculated using the region-tracking mode, and the mode that results in placement of the AR object 104 closer to a target threshold (e.g., a target size, a target location, a target depth) can be selected.

In some implementations, switching between the plane-tracking mode and the region-tracking mode can be triggered by explicit user selection (via a user interface, a gesture, and/or so forth). For example, the user can explicitly select, at a first time (or for a first time-period), the plane-tracking mode for placement of the AR object 104. The user can then explicitly select, at a second time (or for a second time-period), the region-tracking mode for placement of the AR object 104.

In some implementations, switching between the plane-tracking mode and the region-tracking mode can be triggered by a user interaction (via a user interface, a gesture, and/or so forth). In some implementations, the user can trigger switching of modes in response to an interaction (e.g., a movement, a selection) within the AR environment 102. For example, switching modes can be triggered in response to the user moving the AR object 104 within the AR environment 102. As a specific example, an AR object 104 can be placed within the AR environment 102, at a first time (or for a first time-period), based on the plane-tracking mode for placement of the AR object 104. In response to the user moving the AR object 104, at a second time (or for a second time-period) (e.g., after the first time), the region-tracking mode can be used for placement of the AR object 104. In some implementations, the region-tracking mode can be selected at (e.g., after, upon, response to) the end of movement of the AR object 104.

In some implementations, switching between the plane-tracking mode and the region-tracking mode can be performed based on one or more threshold conditions being satisfied. In some implementations, if a threshold condition is satisfied based on monitoring of the AR environment 102, and AR objects placed therein, switching between tracking modes can be performed.

In some implementations, when switching from the plane-tracking mode to the region-tracking mode depth information from the plane-tracking mode can be used within the region-tracking mode. For example, if the AR object 104 is placed within the AR environment 102 using the plane-tracking mode, the depth of the AR object 104 within the AR environment 102 can be determined. When switching to the region-tracking mode, the depth (from the plane-tracking mode) of the AR object 104 can be used for initial placement of the AR object 104.

Because depth information is not determined for the region-tracking mode, differences in depth are resolved when switching from the region-tracking mode to the plane-tracking mode. In other words, the approximated depth (also can be referred to as approximated region depth) within region-tracking mode is transitioned to the calculated (e.g., accurate) depth (also can be referred to as plane depth) of the plane-tracking mode when switching from the region-tracking mode to the plane-tracking mode. When switching from region-tracking mode to plane-tracking mode, world scale (e.g., real-world scale or size) can be preserved (e.g., maintained) or screen size (e.g., object size on the display 10 (e.g., screen)) can be preserved.

If preserving world-scale when switching from region-tracking mode to plane-tracking mode, the approximated depth of the AR object 104 in region-tracking mode is changed to the plane depth of the AR object 104 in plane-tracking mode. This can be accomplished by changing the size of the AR object 104 within the display 10 (e.g., screen) while maintaining the scale of the real-world (e.g., physical world 100 as represented within the AR environment 102). In other words, the size (or scale) of the AR object 104 can be increased or decreased to transition from the approximated depth to the plane depth while maintaining the scale of the real-world.

Figure 2A:
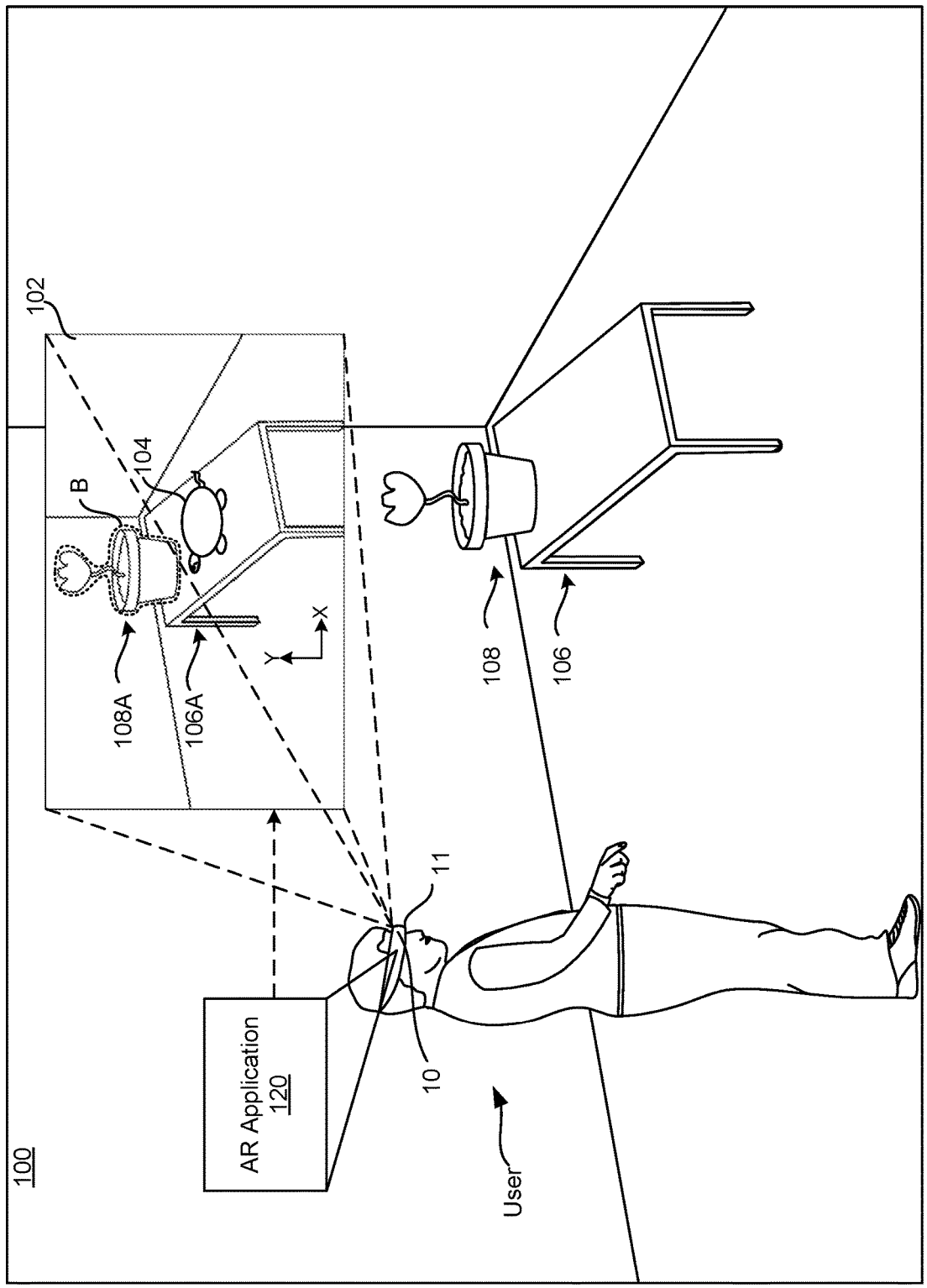
FIGS. 2A and 2B illustrate an example of a transition from the region-tracking mode to the plane-tracking mode while maintaining real-world scale.
Figure 2B:
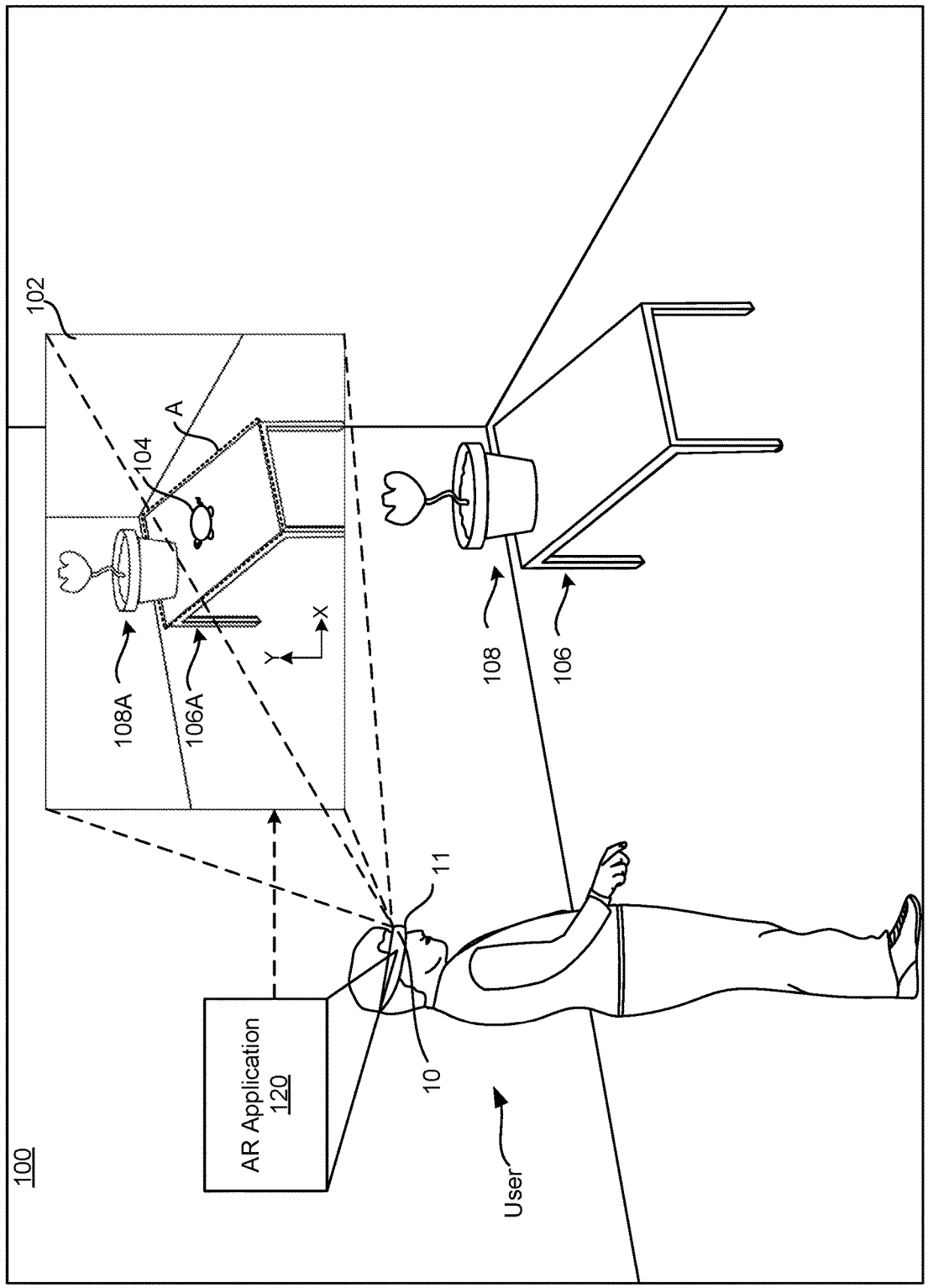

An example transition from the region-tracking mode to the plane-tracking mode while maintaining real-world scale is illustrated in FIGS. 2A and 2B. FIG. 2A illustrates tracking in the region-tracking mode. FIG. 2B illustrates the decreased size of the AR object 104 when switched to the plane-tracking mode. The real-world scale is preserved between FIGS. 2A and 2B.

As an example, consider the case where the plane A is detected, but the user intends to place the AR object 104 on the flower 108A. The plane A and the augmented region B can both be detected, but placement using both can initially be approximately the same. The plane A, which can be more stable in some scenarios, can be used (using the plane-tracking mode) to place the AR object 104. Parallax can be used to determine that placement using the plane A and augmented region B are different if the flower 108A or the camera (user angle) move sufficiently. In such a scenario, the intention of the user to place the AR object 104 on the flower 108A can be determined. The tracking mode can be changed to the region-tracking mode and using the augmented region B.

If preserving screen size when switching from region-tracking mode to plane-tracking mode, the approximated depth of the AR object 104 in region-tracking mode is changed to the plane depth of the AR object 104 in plane-tracking mode while maintaining the scale (or size) of the of the AR object 104 within the display 10 (e.g., screen). In other words, the size (or scale) of the AR object 104 can be maintained during the transition from the approximated depth to the plane depth while the scale (or size) of the real-world changes.

Figure 3A:
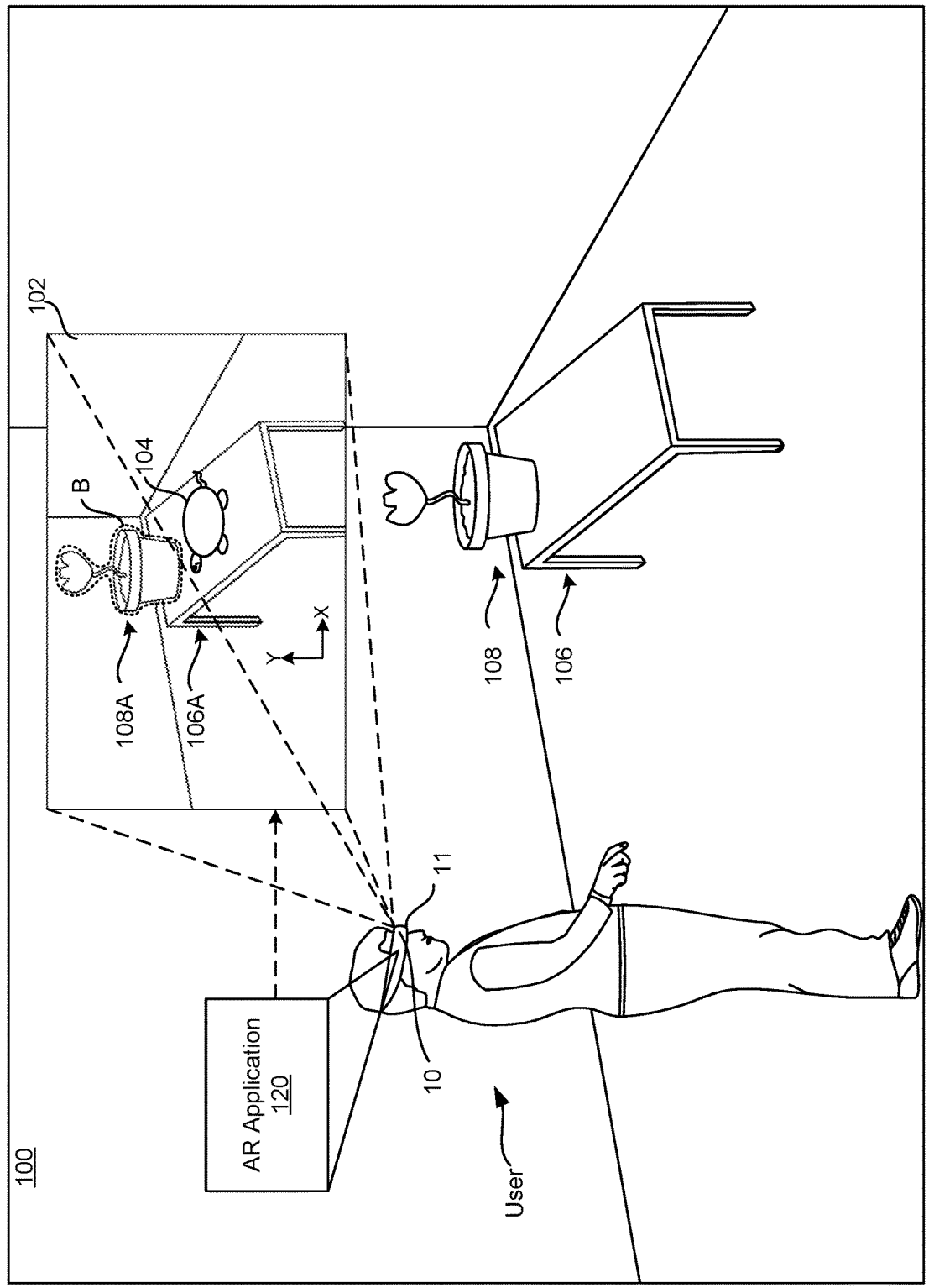
FIGS. 3A and 3B illustrate an example of a transition from the region-tracking mode to the plane-tracking mode while maintaining screen size.
Figure 3B:
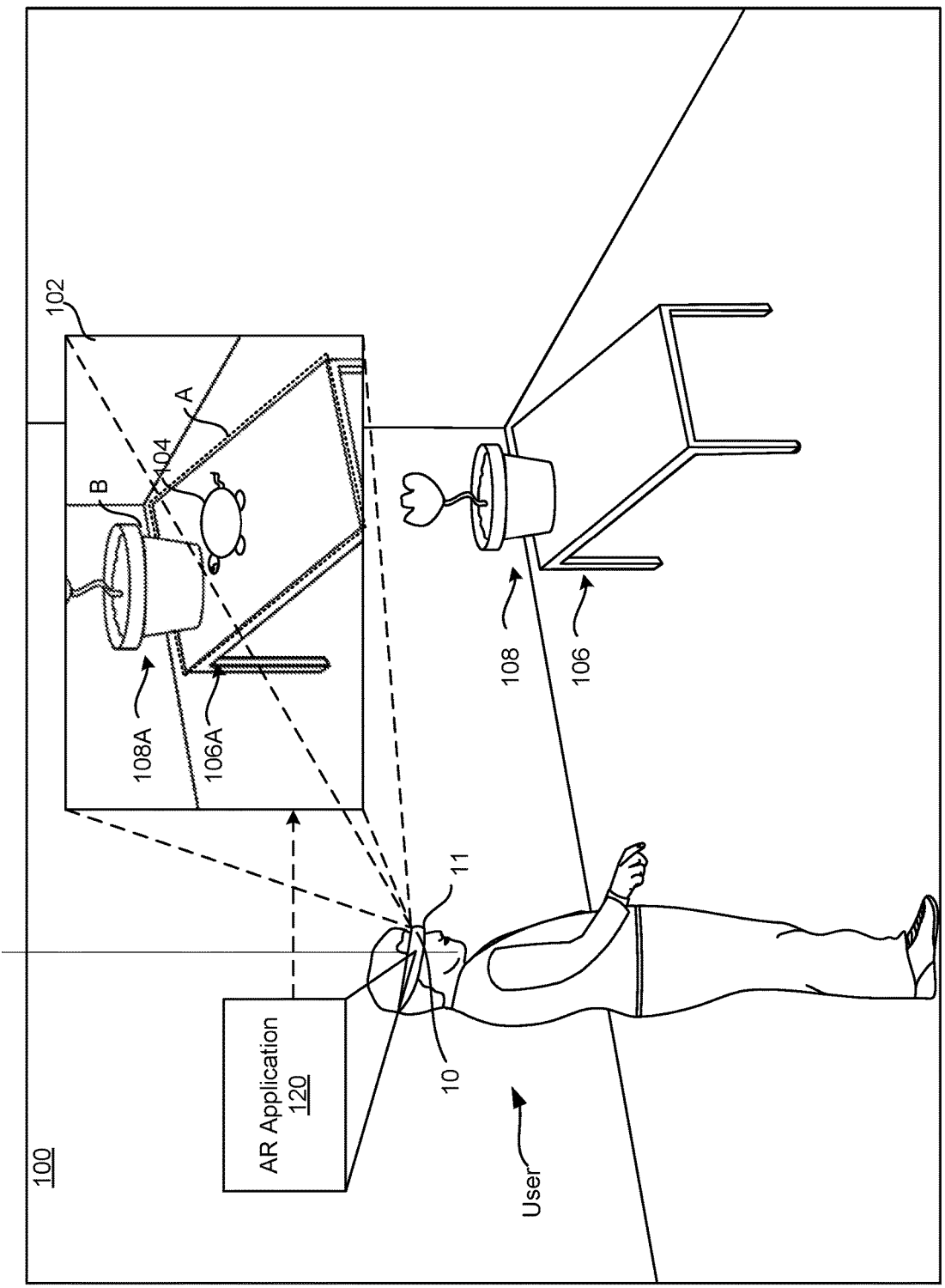

An example transition from the region-tracking mode to the plane-tracking mode while maintaining screen size of the AR object 104 is illustrated in FIGS. 3A and 3B. FIG. 3A illustrates tracking in the region-tracking mode. FIG. 3B illustrates the changed size of the real-world while the scale of the AR object 104, when switched to the plane-tracking mode, is maintained between FIGS. 3A and 3B.

As an example, if the user attempts to place the AR object 104 on a surface (e.g., a plane such as a surface of the table) that has not been detected, the AR object 104 can be initially be placed using the region-tracking mode and a default depth. When the plane A is detected and placement using the augmented region B and the plane A are consistent, the AR object 104 can be moved using the plane-tracking mode onto the plane A. This approach may maintain the screen size of the AR object 104 or the AR object 104 can be resized in ways that are imperceptible to the user.

In some implementations, the scale of the screen and real-world can be changed so that the AR object 104 can have a specified size within the real-world. For example, the screen size and the real-world scale can both be changed so that the AR object 104 has a specified scale (e.g., size) within the scale of the real-world.

In some implementations, the concepts described herein with respect to the AR object 104 can be applied to a variety of AR objects include those that can visually appear to be placed on a horizontal surface such as an AR object (also can be referred to as a ground-based AR object) with feet, wheels, legs, and/or so forth. In some implementations, the AR object 104 can include an AR object (e.g., a non-ground-based AR object) that can be placed elsewhere such as an aircraft, a balloon, a 2.5D object (e.g., a flat object such as text or a sticker within a 3D AR environment), and/or so forth.

Initial placement of an AR object (e.g., AR object 104) can be performed using a variety of methods. For example, in some implementations, an AR object (e.g., a ground-based AR object, a non-ground-based AR object) can be initially placed on a floor or other horizontal plane. In such implementations, the AR object can be initially placed using a plane-tracking mode. In some implementations, a default plane can be defined if no plane is detected using plane-tracking mode.

In some implementations, a default can be defined so that an AR object is not initially placed using a region-tracking mode. In some implementations, a default can be defined so that an AR object of a certain type of AR objects among a plurality of different types of AR objects may be placed (e.g., initially placed) in the region-tracking mode or the plane tracking mode. In some implementations, a non-ground-based AR object can be placed using, by default, a region-tracking mode.

In some implementations, initial placement of an AR object that is non-ground-based AR object can be performed using a region-tracking mode. In some implementations, a region-tracking mode can be used as a default for initial placement of an AR object. In some implementations, and AR object that is initially placed using a region-tracking mode can be assigned a default depth within an AR environment.

In some implementations, a tracking mode can be changed in response to dragging of an AR object. In some implementations, during dragging, an AR object can be positioned on a plane if dragged over it. In some implementations, an AR object can be positioned based on a screen position (e.g., a user's finger screen position) at the last calculated (e.g., known) depth.

In some implementations, in response to a drag of an AR object being released, the AR object can be placed on a plane (using plane-tracking mode) if currently over the plane. In some implementations, an augmented region (e.g., a tracked box) can be requested in a region-tracking mode. If an augmented region associated with a real-world object is determined, the AR object can be placed using the augmented region data and the last calculated (e.g., known) depth using the region-tracking mode. In some implementations, if placement of the AR object using region-tracking mode is unsuccessful, (e.g., if the augmented region goes off-screen, if the augmented region is lost), the AR object can be placed at the last 3D world position of the AR object.

In some implementations, an AR object can be placed with respect to a default plane using the plane-tracking mode. In some implementations, after a plane is detected, the AR object can be moved from the default plane to the detected plane at the same X, Z coordinates.

In some implementations, a real-world scale of a 3D AR object can be maintained during transitions between tracking modes. In some implementations, a screen-size scale of a 2.5D AR object can be maintained during transitions between tracking modes.

In some implementations, the AR environment 102 is provided to the user (via the display 10) as a single image or a pair of stereoscopic images that occupy all or substantially all of the user's field of view and are displayed to the user via the HMD 104. In some implementations, the AR environment 102 is provided to the user by displaying/projecting the AR object 104 on an at least partly transparent combiner that occupies at least a portion of the user's field of view. For example, portions of the HMD 11 may be transparent, and the user may be able to see the physical space 100 through those portions while the HMD 11 is being worn.

Figure 4:
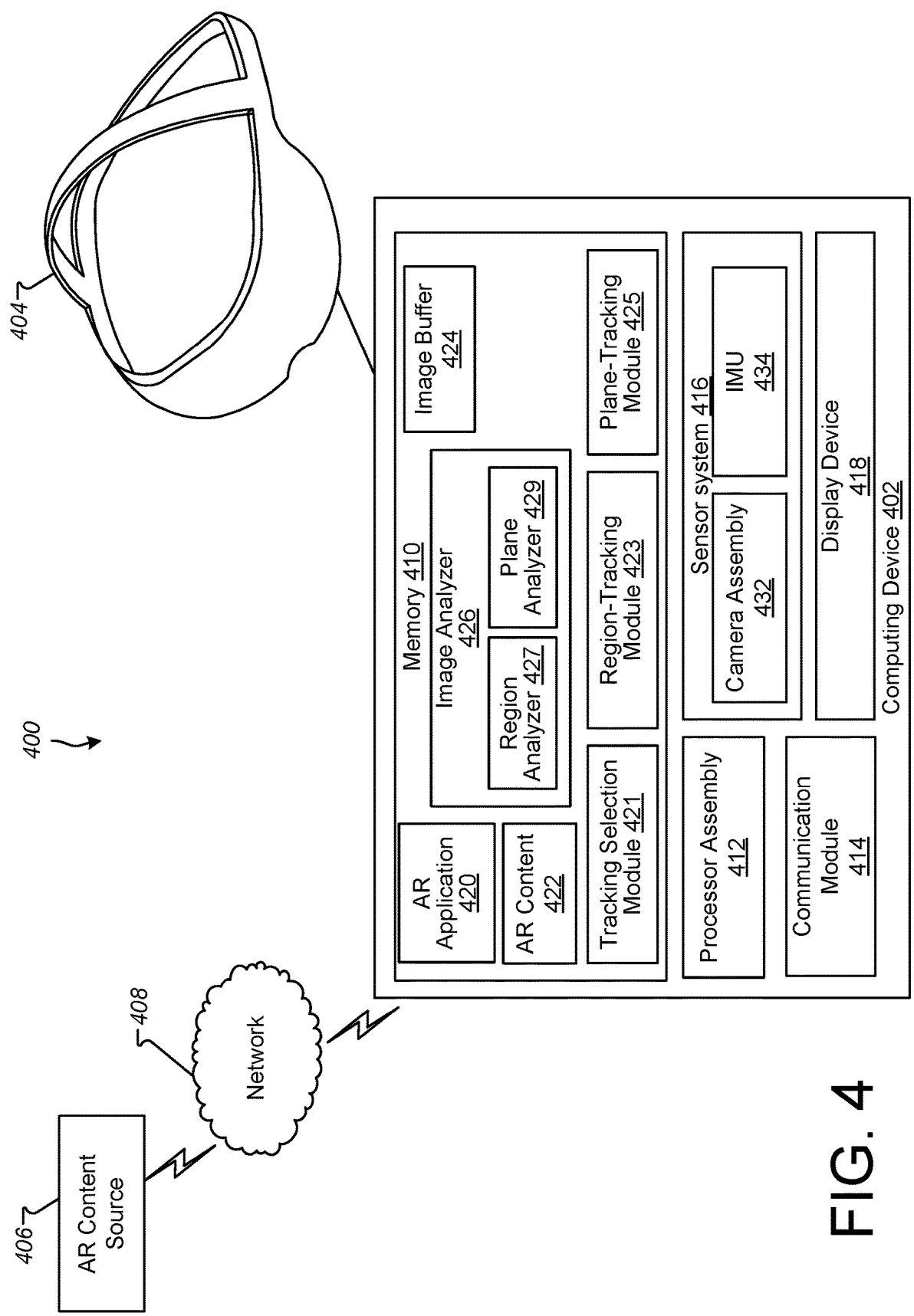
FIG. 4 is a block diagram illustrating a system according to an example implementation.

FIG. 4 is a block diagram illustrating a system 400 according to an example implementation. The system 400 can be configured to generate an augmented reality (AR) environment for a user of the system 400. In some implementations, the system 400 includes a computing device 402, a head-mounted display device (HMD) 404 or other display device (such as a display of the computing device 402), and an AR content source 406. Also shown is a network 408 over which the computing device 402 may communicate with the AR content source 406. A display device such as a mobile phone can be used instead of the HMD 404.

The computing device 402 may include a memory 410, a processor assembly 412, a communication module 414, a sensor system 416, and a display device 418. The memory 410 may include an AR application 420, a tracking selection module 421, AR content 422, a region-tracking module 423, an image buffer 424, a plane-tracking module 425, and an image analyzer 426. The computing device 402 may also include various user input components (not shown) such as a controller that communicates with the computing device 402 using a wireless communications protocol. In some implementations, the computing device 402 is a mobile device (e.g., a smart phone) which may be configured to provide or output AR content to a user via the HMD 404 and/or the display device 418. For example, in some implementations, the computing device 402 and the HMD 404 (or other display device) may communicate via a wired connection (e.g., a Universal Serial Bus (USB) cable) or via a wireless communication protocol (e.g., any WiFi protocol, any BlueTooth protocol, Zigbee, etc.). In some implementations, the computing device 402 can be a component of the HMD 404 and may be contained within a housing of the HMD 404.

In some implementations, the AR application 420 may use the sensor system 416 to determine a location and orientation of a user within a physical space and/or to recognize features or objects within the physical space.

The AR application 420 may present or provide the AR content to a user via the HMD and/or one or more output devices of the computing device 402 such as the display device 418, speakers, and/or other output devices. In some implementations, the AR application 420 includes instructions stored in the memory 410 that, when executed by the processor assembly 412, cause the processor assembly 412 to perform the operations described herein. For example, the AR application 420 may generate and present an AR environment to the user based on, for example, AR content (e.g., AR objects), such as the AR content 422 and/or AR content received from the AR content source 406. The AR content 422 may include content such as images or videos that may be displayed on a portion of the user's field of view in the HMD 404. The AR environment may also include at least a portion of the physical (real-world) environment and physical (real-world) entities. For example, shadows may be generated so that the content better fits the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images.

The AR application 420 may use the image buffer 424 and image analyzer 426 to generate images for display via the HMD 404 based on the AR content 422. For example, one or more images captured by the camera assembly 432 may be stored in the image buffer 424. In some implementations, the image buffer 424 is a region of the memory 410 that is configured to store one or more images. In some implementations, the computing device 402 stores images captured by the camera assembly 432 as a texture within the image buffer 424. Alternatively or additionally, the image buffer may also include a memory location that is integral with the processor assembly 412, such as dedicated random access memory (RAM) on a GPU.

The image analyzer 426 may determine various properties of the image, such as the location of objects or planes (e.g., a surface plane, or surface planes) upon which the content may be positioned. The image analyzer 426 can include a region analyzer 427 configured to determine augmented regions associated with objects (e.g., augmented region B shown in FIG. 1A). The image analyzer 426 can include a plane analyzer 429 configured to determine the planes (e.g., plane A shown in FIG. 1A). Such surface planes can be referred herein as reference surfaces. In some implementations, a given surface plane (reference surface) can be a substantially horizontal plane that corresponds to the ground, a floor, a desk, a table, or another surface upon which objects, such as the content to be inserted, could be placed.

The AR application 420 may determine a location to insert AR content, such as an AR object (a sticker, a character, a sprite, etc.). For example, the AR application may prompt a user to identify a location for inserting the content and may then receive a user input indicating a location on the screen for the content. In some implementations, the user may indicate a location for placing AR content with being prompted. The AR application 420 may determine the location of the inserted content based on that user input. For example, the location for the content to be inserted may be the location indicated by the user. In some implementations, the location is determined by mapping the location indicated by the user to a plane corresponding to a surface such as a tabletop, a desktop, a floor or the ground in the image (e.g., by finding a location on a plane identified by the image analyzer 426 that is below the location indicated by the user). The location may also be determined based on a location that was determined for the content in a previous image captured by the camera assembly (e.g., the AR application may cause the content to move across a surface that is identified within the physical space captured in the image).

The tracking selection module 421 can be configured to determine a mode for tracking. The tracking selection module 421 can be configured to determine a mode for tracking using one or more threshold conditions or triggers (e.g., movement triggers).

The tracking selection module 421 can be configured to trigger tracking using a region-tracking mode using the region-tracking module 423 or tracking using a plane-tracking mode using the plane-tracking module 425.

The tracking selection module 421 can be configured to determine whether a real-world scale or a screen size should be maintained when transitioning or switching between tracking modes. The tracking selection module 421 can be configured to determine a depth of an AR object when transitioning or switching between tracking modes.

In some implementations, the image analyzer 426 may include instructions stored in the memory 410 that, when executed by the processor assembly 412, cause the processor assembly 412 to perform operations described herein to generate an image or series images that are displayed to the user (e.g., via the HMD 404).

The AR application 420 may update the AR environment based on input received from the camera assembly 432, the IMU 434, and/or other components of the sensor system 416. For example, the IMU 434 may detect motion, movement, and/or acceleration of the computing device 402 and/or the HMD 404. The IMU 434 may include various different types of sensors such as, for example, an accelerometer, a gyroscope, a magnetometer, and other such sensors. A position and orientation of the HMD 404 may be detected and tracked based on data provided by the sensors included in the IMU 434. The detected position and orientation of the HMD 404 may allow the system to detect and track the user's position and orientation within a physical space. Based on the detected position and orientation, the AR application 420 may update the AR environment to reflect a changed orientation and/or position of the user within the environment.

Although the computing device 402 and the HMD 404 are shown as separate devices in FIG. 4, in some implementations, the computing device 402 may include the HMD 404 (or other display device such as a mobile phone). In some implementations, the computing device 402 communicates with the HMD 404 via a cable, as shown in FIG. 4. For example, the computing device 402 may transmit video signals and/or audio signals to the HMD 404 for display for the user, and the HMD 404 may transmit motion, position, and/or orientation information to the computing device 402.

The AR content source 406 may generate and output AR content, which may be distributed or sent to one or more computing devices, such as the computing device 402, via the network 408. In an example implementation, the AR content includes three-dimensional scenes and/or images. Additionally, the AR content may include audio/video signals that are streamed or distributed to one or more computing devices. The AR content may also include an AR application that runs on the computing device 402 to generate 3D scenes, audio signals, and/or video signals.

The memory 410 can include one or more non-transitory computer-readable storage media. The memory 410 may store instructions and data that are usable to generate an AR environment for a user.

The processor assembly 412 includes one or more devices that are capable of executing instructions, such as instructions stored by the memory 410, to perform various tasks associated with generating an AR environment. For example, the processor assembly 412 may include a central processing unit (CPU) and/or a graphics processor unit (GPU). For example, if a GPU is present, some image/video rendering tasks, such as displaying AR objects, displaying aspects of elevating AR objects (such as displaying tether lines), generating shadows or shading polygons representing shadows of AR objects, etc., may be offloaded from the CPU to the GPU.

The communication module 414 includes one or more devices for communicating with other computing devices, such as the AR content source 406. The communication module 114 may communicate via wireless or wired networks, such as the network 408.

The sensor system 416 may include various sensors, such as a camera assembly 432. Implementations of the sensor system 416 may also include other sensors, including, for example, an inertial motion unit (IMU) 434, a light sensor, an audio sensor, an image sensor, a distance and/or proximity sensor, a contact sensor such as a capacitive sensor, a timer, and/or other sensors and/or different combination(s) of sensors.

The IMU 434 detects motion, movement, and/or acceleration of the computing device 402 and/or the HMD 404. The IMU 434 may include various different types of sensors such as, for example, an accelerometer, a gyroscope, a magnetometer, and other such sensors. A position and orientation of the HMD 404 may be detected and tracked based on data provided by the sensors included in the IMU 434. The detected position and orientation of the HMD 404 may allow the system to detect and track the user's gaze direction and head movement, or movement of the computing device 402.

The camera assembly 432 captures images and/or videos of the physical space around the computing device 402. The camera assembly 432 may include one or more cameras. The camera assembly 432 may also include an infrared camera.

The network 408 may be the Internet, a local area network (LAN), a wireless local area network (WLAN), and/or any other network. A computing device 402, for example, may receive the audio/video signals, which may be provided as part of AR content in an illustrative example implementation, via the network.

FIGS. 5 through 8 illustrate a method for performing at least some of the processes described herein. The methods can be performed using any of the hardware and/or software described herein. Any of the methods can be implemented in a computer-readable medium.

Figure 5:
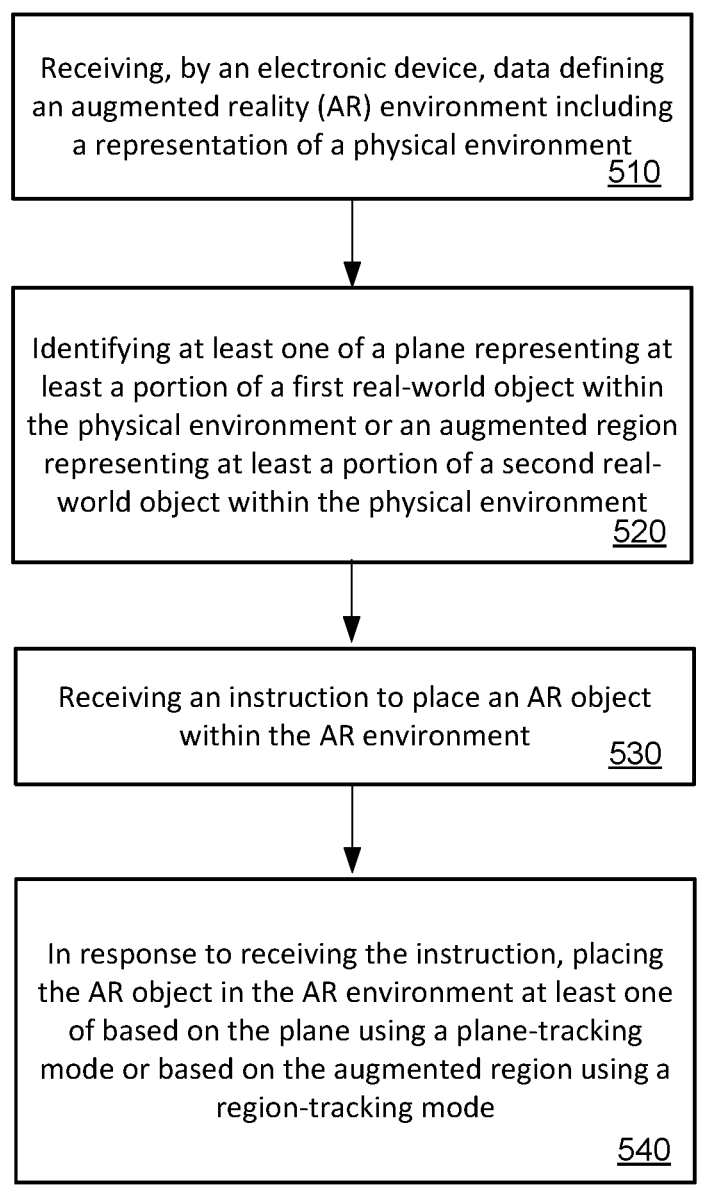
FIGS. 5 through 8 illustrates a method for performing at least some of the processes described herein.

FIG. 5 illustrates a method that includes receiving, by an electronic device, data defining an augmented reality (AR) environment including a representation of a physical environment (block 510), e.g., from a camera assembly, an IMU, and/or another component of a sensor system of the electronic device. The method also includes identifying at least one of a plane representing at least a portion of a first real-world object within the physical environment or an augmented region representing at least a portion of a second real-world object within the physical environment (block 520), e.g., by means of an image analyzer that analyzes one or more images, e.g., of the augmented reality environment.

The method can include receiving an instruction (e.g., by user input or interaction) to place an AR object within the AR environment (block 530) and in response to receiving the instruction, placing the AR object in the AR environment at least one of based on the plane using a plane-tracking mode or based on the augmented region using a region-tracking mode.

Figure 6:
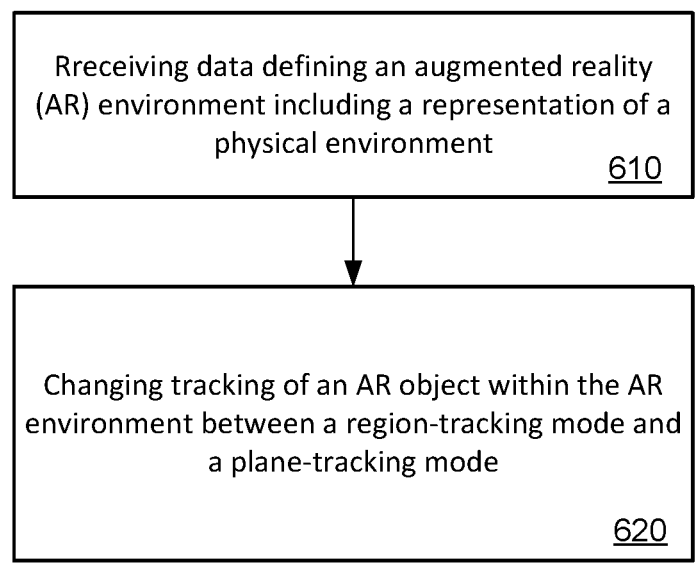

FIG. 6 illustrates a method that includes receiving data defining an augmented reality (AR) environment including a representation of a physical environment (block 610) and changing tracking of an AR object within the AR environment between a region-tracking mode and a plane-tracking mode (block 620). The region-tracking mode can include tracking a depth of the AR object within the AR environment based on a two-dimensional region representing a first real-world object within the physical environment. The plane-tracking mode can include tracking the depth of the AR object within the AR environment based on a plane representing a second real-world object within the physical environment.

Figure 7:
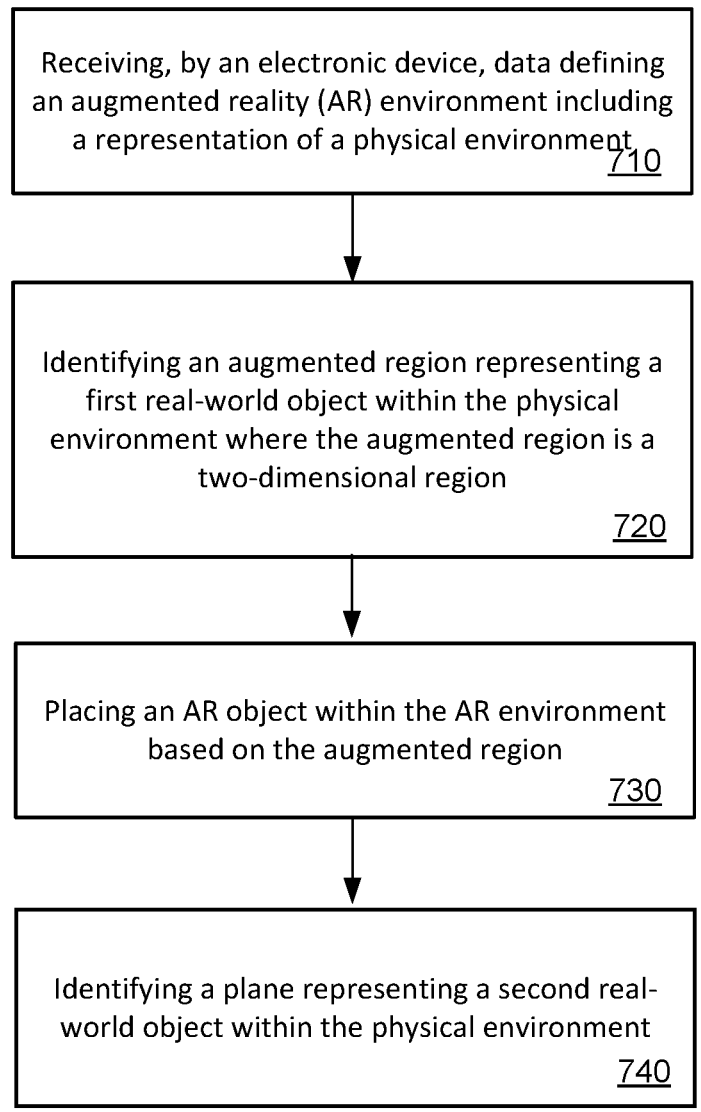

FIG. 7 illustrates a method that includes receiving, by an electronic device, data defining an augmented reality (AR) environment including a representation of a physical environment (block 710) and identifying an augmented region representing a first real-world object within the physical environment where the augmented region is a two-dimensional region (block 720). The method can include placing an AR object within the AR environment based on the augmented region (block 730) and identifying a plane representing a second real-world object within the physical environment (block 740). The method can further include placing the AR object in the AR environment based on the plane.

Figure 8:
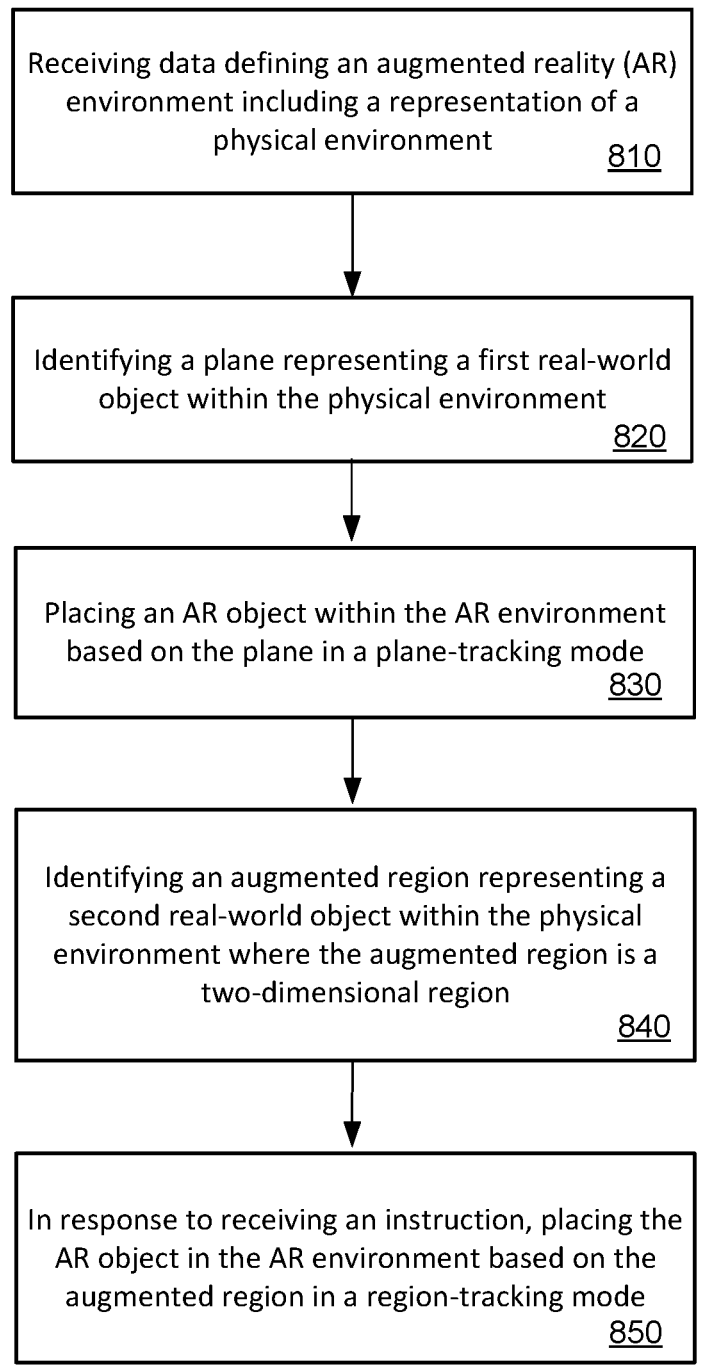

FIG. 8 illustrates a method that includes receiving data defining an augmented reality (AR) environment including a representation of a physical environment (block 810) and identifying a plane representing a first real-world object within the physical environment (block 820). The method can include placing an AR object within the AR environment based on the plane in a plane-tracking mode (block 830) and identifying an augmented region representing a second real-world object within the physical environment where the augmented region is a two-dimensional region (block 840). In response to receiving an instruction, placing the AR object in the AR environment based on the augmented region in a region-tracking mode (block 850).

Figure 9:
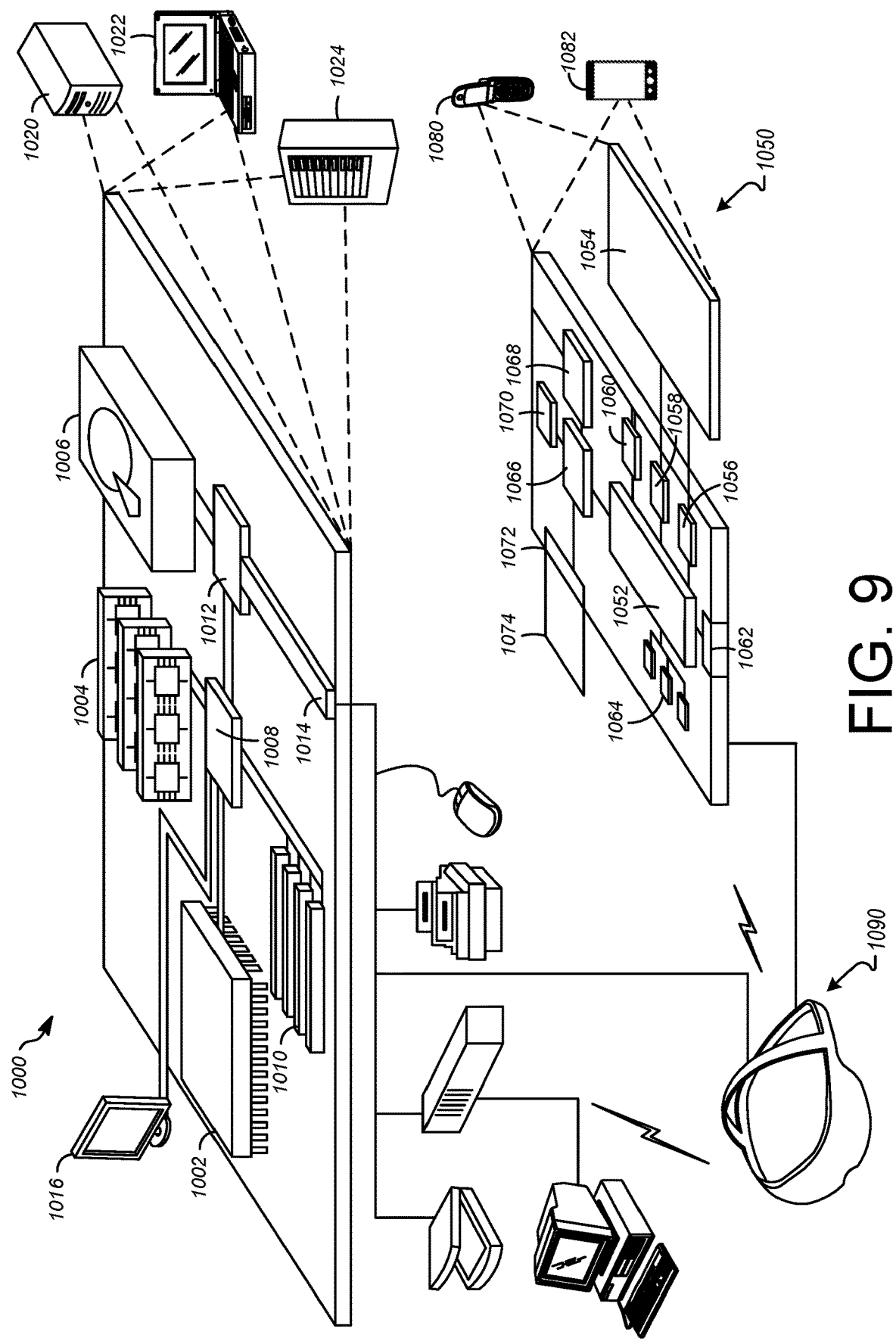
FIG. 9 shows an example of a computer device and a mobile computer device that can be used to implement the techniques described herein.

FIG. 9 shows an example of a computer device and a mobile computer device that can be used to implement the techniques described here. FIG. 9 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1009 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1009, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1009. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1009 manages bandwidth-intensive operations for the computing device 1000, while the low speed controller 1012 manages lower bandwidth-intensive operations. Such allocation of functions is exemplary only. In one implementation, the high-speed controller 1009 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1069, among other components. The device 1050 may also be provided with a storage device, such as a microdrive or other device, to provide additional storage. Each of the components 1050, 1052, 1064, 1054, 1066, and 1069, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1059 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1059 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1069 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1069. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1090. It may also be implemented as part of a smart phone 1092, personal digital assistant, or other similar mobile device.

A user can interact with a computing device using a tracked controller 1094. In some implementations, the controller 1094 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 1094 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with a virtual reality (VR headset 1095). For example, one or more sensors included on a computing device 1050 or other computing device depicted in FIG. 9, can provide input to VR headset 1095 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1095 for example, as movements on the rendered touchpad in the VR space. The rendered movements can control objects in the VR space.

In some implementations, one or more output devices included on the computing device 1050 can provide output and/or feedback to a user of the VR headset 1095 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1095.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, by an electronic device, data defining an augmented reality (AR) environment including a representation of a physical environment;
identifying a plane representing at least a portion of a first real-world object within the physical environment and an augmented region being a boundary associated with at least a portion of a second real-world object within the physical environment;
receiving an instruction to place an AR object within the AR environment;
in response to receiving the instruction, placing the AR object in the AR environment at a first time based on the augmented region using a region-tracking mode, the augmented region being a two-dimensional region without depth information; and
switching, at a second time, to placing the AR object based on the plane using a plane-tracking mode.

2. The method of claim 1, further comprising:
maintaining a scale of the physical environment as displayed with a screen of the electronic device while changing a depth of the AR object such that a size of the AR object is changed within the screen of the electronic device.

3. The method of claim 1, further comprising:
modifying a depth of the AR object within the AR environment in response to a change in size of the augmented region.

4. The method of claim 1, wherein the plane is a three-dimensional plane having a depth.

5. The method of claim 1, wherein a world scale of the AR object is maintained when switching between the region-tracking mode and the plane-tracking mode.

6. The method of claim 1, further comprising:
changing a scale of the AR object when changing from the region-tracking mode to the plane-tracking mode.

7. A method, comprising:
receiving data defining an augmented reality (AR) environment including a representation of a physical environment; and
changing tracking of an AR object within the AR environment between a region-tracking mode and a plane-tracking mode,
the region-tracking mode including tracking the AR object within the AR environment based on a two-dimensional region without depth information, the two-dimensional region being a boundary associated with a first real-world object within the physical environment,
the plane-tracking mode including tracking a depth of the AR object within the AR environment based on a plane representing a second real-world object within the physical environment, the AR object having a world scale maintained when switching between the region-tracking mode and the plane-tracking mode.

8. The method of claim 7, further comprising when changing from region-tracking mode to plane-tracking mode:
maintaining a scale of the physical environment as displayed with a screen of an electronic device while changing the depth of the AR object such that a size of the AR object is changed within the screen of the electronic device.

9. The method of claim 7, further comprising when changing from region-tracking mode to plane-tracking mode:
maintaining a size of the AR object as displayed with a screen of an electronic device while changing a scale of the physical world such that the depth of the AR object is changed.

10. The method of claim 7, further comprising when changing from plane-tracking mode to augmented-region tracking mode:
using the depth of the AR object used in the plane-tracking mode to place the AR object based on the two-dimensional region in the augmented-region tracking mode.

11. The method of claim 7, wherein the plane is a three-dimensional plane having a depth.

12. A method, comprising:
receiving, by an electronic device, data defining an augmented reality (AR) environment including a representation of a physical environment;
identifying an augmented region, the augmented region being represented by a collection of points associated with a boundary of a first real-world object within the physical environment, the augmented region being a two-dimensional region without depth information;

placing an AR object within the AR environment based on the augmented region;

identifying a three-dimensional plane representing a second real-world object within the physical environment; and placing the AR object in the AR environment based on the three-dimensional plane, the three-dimensional plane being a three-dimensional region with a depth.

13. The method of claim 12, wherein the AR object has an initial depth when placed based on the augmented region.

14. The method of claim 12, wherein the three-dimensional plane represents a surface of the second real-world object.

15. The method of claim 12, further comprising:

modifying a depth of the AR object within the AR environment in response to a change in size of the augmented region.

16. The method of claim 12, further comprising:

changing from a region-tracking mode based on the augmented region to a plane-tracking mode based on the three-dimensional plane in response to receiving an instruction to move the AR object.

17. The method of claim 12, wherein the augmented region is not visible within a display.

18. The method of claim 12, wherein the augmented region is a two-dimensional surface separate from an image of the first real-world object.

19. A method, comprising:

receiving data defining an augmented reality (AR) environment including a representation of a physical environment;

identifying a plane representing a first real-world object within the physical environment;

placing an AR object within the AR environment based on the plane in a plane-tracking mode, the plane having a calculated depth;

identifying an augmented region representing a boundary associated with a second real-world object within the physical environment, the augmented region being a two-dimensional region without depth information; and in response to receiving an instruction, placing the AR object in the AR environment based on the augmented region in a region-tracking mode.

20. The method of claim 19, further comprising:

changing from the plane-tracking mode to the region-tracking mode is in response to receiving the instruction to move the AR object.

21. The method of claim 19, wherein the augmented region represents a space occupied within the AR environment of the second real-world object.

* * * * *